United States Patent
Guido et al.

(10) Patent No.: US 10,957,015 B2
(45) Date of Patent: Mar. 23, 2021

(54) BRIGHTNESS-COMPENSATING SAFE PIXEL ART UPSCALER

(71) Applicant: Nintendo Co., Ltd., Kyoto (JP)

(72) Inventors: Sébastien Guido, Paris (FR); Janos Boudet, Paris (FR)

(73) Assignee: NINTENDO CO., LTD., Kyoto (JP)

( * ) Notice: Subject to any disclaimer, the term of this patent is extended or adjusted under 35 U.S.C. 154(b) by 173 days.

(21) Appl. No.: 15/943,468

(22) Filed: Apr. 2, 2018

(65) Prior Publication Data
US 2018/0225806 A1    Aug. 9, 2018

Related U.S. Application Data

(62) Division of application No. 14/900,919, filed as application No. PCT/IB2013/001642 on Jun. 24, 2013, now Pat. No. 9,972,070.

(51) Int. Cl.
*G06T 3/40* (2006.01)

(52) U.S. Cl.
CPC ............ *G06T 3/4053* (2013.01); *G06T 3/40* (2013.01)

(58) Field of Classification Search
None
See application file for complete search history.

(56) References Cited

U.S. PATENT DOCUMENTS

| | | | |
|---|---|---|---|
| 5,012,336 A | 4/1991 | Gillard | |
| 5,245,416 A * | 9/1993 | Glenn | H04N 9/07 348/219.1 |
| 5,270,812 A * | 12/1993 | Richards | H04N 5/765 375/240.01 |
| 5,724,456 A | 3/1998 | Boyack et al. | |
| 6,236,761 B1 | 5/2001 | Marchand | |
| 7,277,183 B2 | 10/2007 | Deck | |
| 8,743,963 B2 * | 6/2014 | Kanumuri | G06T 3/4053 375/240.2 |
| 8,913,822 B2 * | 12/2014 | Matsuda | G06T 3/4053 382/155 |
| 2003/0048393 A1 * | 3/2003 | Sayag | G09G 3/3611 349/5 |
| 2004/0105029 A1 * | 6/2004 | Law | H04N 7/012 348/448 |
| 2005/0280346 A1 * | 12/2005 | Takeuchi | G09G 3/22 313/491 |

(Continued)

FOREIGN PATENT DOCUMENTS

EP    0 677 821 A2    10/1995

*Primary Examiner* — Michelle M Entezari
(74) *Attorney, Agent, or Firm* — Nixon & Vanderhye PC (57) ABSTRACT

Low spatial frequencies of an original image and an upscaled filtered image are analyzed. Differences will be observed in the low frequency components of the two images in the general case since the pixel art upscaler filter as a side effect introduces low frequency changes. A modification to images produced by the PAU is applied to attempt to match the brightness of the original images in the low frequency spectrum. From a viewer perspective (e.g., based on typical blurring visual effects), the original image and the modified filtered image will look the same—demonstrating that there is no low frequency brightness creep or resulting increased photosensitivity concerns.

23 Claims, 6 Drawing Sheets
(2 of 6 Drawing Sheet(s) Filed in Color)

(56) References Cited

U.S. PATENT DOCUMENTS

| | | | |
|---|---|---|---|
| 2006/0139312 A1* | 6/2006 | Sinclair | G06F 3/0481 |
| | | | 345/156 |
| 2006/0221260 A1 | 10/2006 | Fujine et al. | |
| 2006/0245664 A1* | 11/2006 | Chang | G06T 5/20 |
| | | | 382/263 |
| 2008/0095450 A1 | 4/2008 | Kirenko | |
| 2009/0295706 A1* | 12/2009 | Feng | G09G 3/342 |
| | | | 345/102 |
| 2010/0214486 A1* | 8/2010 | Sasaki | H04N 5/14 |
| | | | 348/607 |
| 2012/0183224 A1* | 7/2012 | Kirsch | G06K 9/4619 |
| | | | 382/195 |
| 2013/0148872 A1 | 6/2013 | Aisaka et al. | |
| 2015/0104116 A1 | 4/2015 | Salvador et al. | |
| 2015/0187048 A1* | 7/2015 | Yang | G06T 3/403 |
| | | | 345/660 |
| 2017/0024852 A1* | 1/2017 | Oztireli | G06T 3/40 |
| 2017/0084006 A1* | 3/2017 | Stewart | G06T 5/002 |

* cited by examiner

FIG. 1
Applying PAU algorithm on a grid of black dots increases luminance reveal underlying patterns.

FIG. 2
Applying PAU algorithm on a checkerboard with small variations can reveal underlying patterns

FIG. 3
Comparison between original image (left), PAU image (center) and expected result with SPAU (right).

FIG. 4: Definition of a discrete filter.

FIG. 5: Definition of an ideal downsampling.

FIG. 6: Kernel of the Lanczos2 filter for D = 2 (left) and its Fourier transform (right).

Figure7:
Definition of input image pixel indexes from output pixel coordinates *i,j*.

FIG. 7A

FIG. 8: SPAU process.

FIG. 9

BRIGHTNESS-COMPENSATING SAFE PIXEL ART UPSCALER

CROSS-REFERENCE TO RELATED APPLICATIONS

This application is a division of U.S. patent application Ser. No. 14/900,919 filed Dec. 22, 2015; which is the U.S. national phase of International Application No. PCT/IB2013/001642 filed Jun. 24, 2013. The disclosures of these applications are incorporated herein in their entirety by reference.

STATEMENT REGARDING FEDERALLY SPONSORED RESEARCH OR DEVELOPMENT

None.

FIELD

The technology herein relates to filtering to improve the visual quality on higher resolution display images. In example embodiments, images are digitally scaled to a higher resolution and then compensated for brightness changes to avoid photosensitivity.

BACKGROUND AND SUMMARY

Just as the ancients constructed mosaics from squares of colored glass or stone, a pixel art graphics artist selects the color of each pixel in a pixel art image from a color palette. The video game and computer hardware of the 1980's and 1990's imposed limitations that channeled graphics designers toward pixel art. Some of the best loved video game characters and graphics of all time were created using pixel art. While modern graphics artists generally have more flexibility, some have chosen to use pixel art for aesthetic or other reasons.

Display resolution has increased dramatically over the last twenty years. Early home video game systems had display resolutions on the order of about 250×250 pixels or less. Currently, high definition televisions have display resolutions of 1920×1080 pixels, and some modern computer displays have even higher display resolution. When one attempts to use higher resolution displays to display lower resolution pixel art, the result can be unsatisfactory. Whereas early lower resolution displays might have tended to blur pixels together to create an aesthetically pleasing effect, higher resolution displays tend to bring out the blocky (pixelated) constitution of pixel art. The resulting images are not aesthetically pleasing.

A common solution is to "upscale" the pixel art images for rendering on modern displays. This often means replacing each pixel in the original image with a block of higher resolution pixels, and performing some type of filtering to smooth the resulting image. Various techniques are known for performing such upscaling. See for example Kopf et al, "Depixelizing Pixel Art" (Microsoft Research 2011).

One example non-limiting Pixel Art Upscaler ("PAU") is a process that creates, from an input picture, a picture with a 2×2 resolution increase. This algorithm works well on images that contain pixel art, namely hand-made low resolution images using palletized colors, that are characterized by flat colors and outlines. The purpose of such a PAU algorithm is to upscale the original picture, while trying to keep the flat colors and the intended hard edges and reducing or removing the staircase effect of the original picture. In particular, the goal of the PAU is to modify high frequencies in the image to make edges sharper.

This process is successful but has been identified to have a side effect of potentially modifying the brightness of certain areas compared to the original image—for example, to modify low frequency spatial components in a way that causes the upscaled image to exhibit local brightness changes. Such modified brightness can cause concerns regarding photosensitivity. Work has been done in the past to analyze video for photosensitivity (see for example HardingFPA software available from Cambridge Research Systems, Ltd.) but further improvements are possible and desirable.

The example non-limiting technology herein provides a filtering algorithm that compensates for brightness modification so that moving images including but not limited to video games that are already compliant with photosensitivity guidelines can benefit from PAU without losing their compliance. One advantage provided by the example non-limiting technology herein is that in the context of a brightness-compensated real time pixel upscaler, image streams tested for photosensitivity before upscaling do not need to be retested after upscaling. Meanwhile, the example non-limiting technology herein can be used in any context where real time or other flash or brightness compensation is desired irrespective of previous testing and/or image source.

In one example non-limiting implementation, the system analyzes the low spatial frequencies of the original image and of the upscaled filtered image. Differences will be observed in the low frequency components of the two images in the general case since the PAU filter as a side effect introduces low frequency changes. The example non-limiting implementation applies a modification to images produced by the PAU to attempt to match the brightness of the original images in the low frequency spectrum. Such matching can be accomplished for example by simple brightness subtraction on a pixel by pixel or other localized basis. From a viewer perspective (e.g., based on typical blurring visual effects), the original image and the modified filtered image will look the same—demonstrating that there is no low frequency brightness creep.

The example non-limiting technology herein uses a concept that could be called filter band limiting. It modifies any filter into a filter that will correctly preserve low spatial frequencies (i.e., the source and destination images will appear identical or nearly identical when blurred). This process can effectively be used to improve, or make photosensitive-safe, any image filter such as denoising filters, deblocking filters, deblurring filters or other filters.

The example non-limiting technology herein thus provides systems and methods that guarantee that, whatever artifacts are introduced by pixel art or other upscaling, they do not incur any global brightness modifications. The resulting images are very close to being as safe as the original images in terms of photosensitivity.

Furthermore, the example non-limiting safe filter can be implemented on a central processing unit, a graphics processing unit, using embedded logic, or using any other specific, specialized or general purpose hardware. Additionally, television sets or any other display devices could benefit from the example non-limiting safe filter after applying their own filters, such as for example upscaling, deinterlacing, and/or noise reduction. Such a filter can also be inserted in broadcast TV company production systems, or movie post production systems. Many other applications are possible.

BRIEF DESCRIPTION OF THE DRAWINGS

These and other features and advantages may be better and more completely understood by referring to the following detailed description of example non-limiting embodiments and implementations in conjunction with the drawings. The patent or application file contains at least one drawing executed in color. Copies of this patent or patent application publication with color drawing(s) will be provided by the Office upon request and payment of the necessary fee. The drawings include the following.

DETAILED DESCRIPTION

Generally speaking, those skilled in the art will understand that there can be two aspects of photosensitivity issues: flashes over a large portion of the screen, and regular patterns over a large portion of the screen. The example non-limiting embodiments focus on ensuring that safe pixel art upscaling ("SPAU") does not create photosensitivity issues that the original image did not cause.

Figure 1:
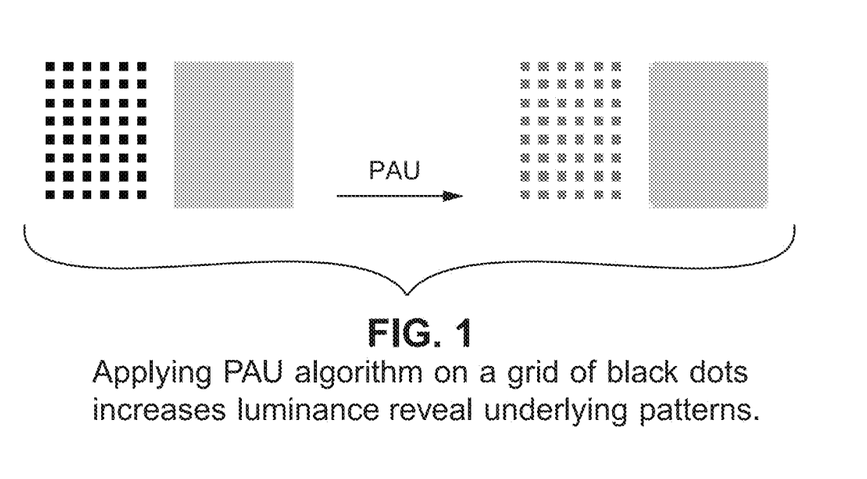
FIG. 1 shows applying an example non-limiting pixel art upscaling (PAU) algorithm on a grid of black dots, which can be seen to increase luminance.
Figure 2:
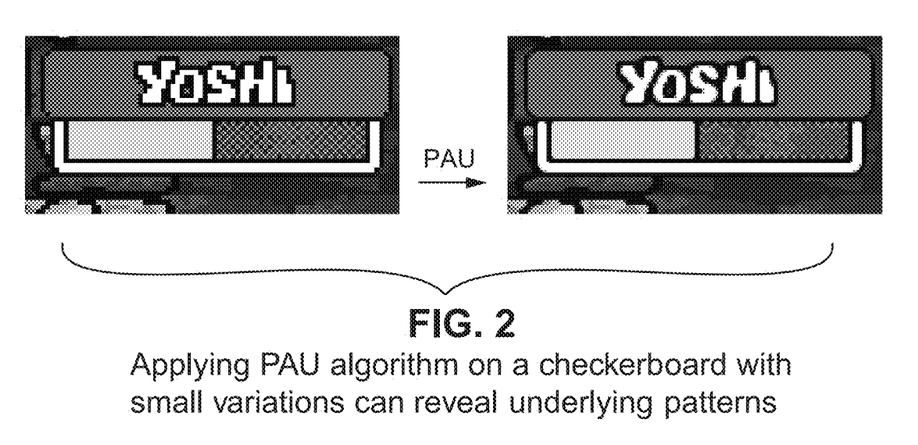
FIG. 2 shows that applying an example non-limiting PAU algorithm on a checkerboard with small variations can reveal underlying patterns.

When magnified or upscaled by a pixel art upscaler (PAU), most non-linear images will tend to exhibit some kind of brightness change. In particular, repeated patterns in an original image can create local brightness changes that some might say are potentially problematic. FIGS. 1 and 2 show some examples of effects. FIG. 1 shows a case where PAU can modify luminance in an area. This can create potentially harmful flashes if consecutive images have their brightness modified in opposite directions. To remove this risk, example non-limiting filtering algorithms will compensate brightness changes to make sure that the original image and the SPAU filtered image have the same brightness when measured over medium to large screen areas. (In fact, a low pass filter of the original image will be identical to a low pass filter of the SPAU filtered image in one example implementation).

FIG. 2 shows that PAU can reveal patterns when the original image has two characteristics:
- a low frequency pattern that comes from the background,
- a high frequency signal with a high amplitude that does not trigger a failure of the Harding Flash and Pattern Analyzer ("FPA") test is present in the original image—in this case the checkerboard pattern.

When this happens, the PAU can reveal the underlying pattern by smoothing out the high frequency signal, thus revealing the low frequency pattern and increasing its contrast by using the energy of the former high frequency signal. The brightness compensation will reduce the contrast of such patterns.

Figure 3:
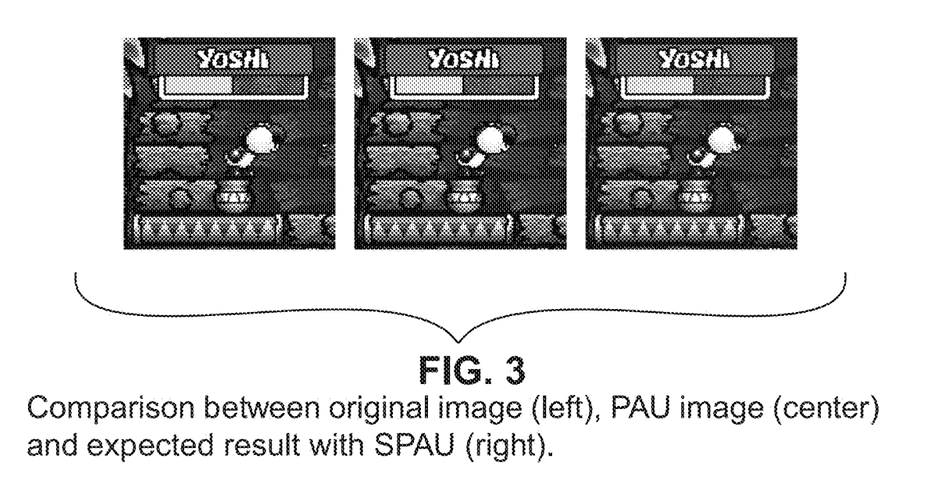
FIG. 3 shows comparison between an original image (left), a PAU image (center) and an expected result with brightness compensation (right). Note the differences that occur in the checkerboard pattern. Also, see how some colors were darkened by PAU and brought back by brightness compensation, like in the o of Yoshi, or little details in the character (eyes, hair . . . ).

Moreover, it is expected that, as a positive side effect, SPAU will produce images of better quality regarding their faithfulness to original images as in FIG. 3. In particular, FIG. 3 shows a comparison between an original image (left), a PAU image (center) and an expected result with SPAU (right). Note the differences that occur in the checkerboard pattern. Also, see how some colors were darkened by PAU and brought back by brightness compensation, like in the o of Yoshi, or little details in the character (eyes, hair . . . ).

Example Non-Limiting Digital Signal Processing Elements

This section will remind us of some useful results from digital signal processing theory. See Proakis et al, *Digital Signal Processing* (Pearson Prentice Hall, Fourth Edition, 2007) for more details.

In this section, we will work on one-dimensional signals on a variable, t, which we will call time for simplicity. However, results are transposable to spatial signals, like images (see below).

Fourier Transform

The Fourier transform is well known. We will remind here some known properties, without giving proof as they can be found in general reference books about the subject (see e.g., Proakis text).

Given an analog signal x(t), defined over time, we can compute its Fourier transform X(F), defined over frequencies, as:

$$X(F) = \int_{-\infty}^{\infty} x(t) e^{-j2\pi Ft} \, dt \qquad (1)$$

The Fourier transform is a reversible operation:

$$x(t) = \int_{-\infty}^{\infty} X(F) e^{j2\pi Ft} \, dF. \qquad (2)$$

We will note:

$$x(t) \xleftrightarrow{\mathcal{F}} X(F)$$

The Fourier transform has some useful properties, among which is the convolution theorem, that states that a convolution of signals in the time domain is equivalent to multiplying their spectra in the frequency domain.

If:

$$x_1(t) \overset{\mathcal{F}}{\longleftrightarrow} X_1(F) \quad (3)$$

and $$x_2(t) \overset{\mathcal{F}}{\longleftrightarrow} X_2(F)$$

then $$(x_1 * x_2)(t) \overset{\mathcal{F}}{\longleftrightarrow} X_1(F) X_2(F)$$

The opposite relation is also true:

$$x_1(t) x_2(t) \overset{\mathcal{F}}{\longleftrightarrow} (X_1 * X_2)(F) \quad (4)$$

This property will be used in the sections below.

Sampling Theorem and Ideal Reconstruction

Sampling is the process of converting an analog signal, say $x_a(t)$, into a discrete sequence $x(n)$ by taking samples of $x_a(t)$ with a period of $T_s$. $F_s = 1/T_s$ is then the sampling frequency.

$$x(n) = x_a(nT_s), m \in \mathbb{Z} \quad (5)$$

The Nyquist-Shannon sampling theorem states that if $x_a(t)$ is bandlimited, i.e., it does not contain any frequency greater than B, it can be uniquely recovered from its samples provided that the sampling frequency $F_s$, verifies: $F_s \geq 2B$.

Then, the analog signal $x_a(t)$ could be reconstructed from $x(n)$ by the following formula:

$$x_a(t) = \sum_{n=-\infty}^{\infty} x(n) \text{sinc}(\pi(F_s t - n)) \quad (6)$$

where sinc is the unnormalized sinc function:

$$\text{sinc}(x) = \begin{cases} \dfrac{\sin(x)}{x}, & x \neq 0 \\ 1, & x = 0 \end{cases} \quad (7)$$

We should note that, as sinc is the Fourier transform of a gate function, and using the fact that a convolution in temporal space is equivalent to a multiplication in frequency space, this reconstruction can be seen as a low pass filtering of the discrete signal.

Ideal Filter

Ideal analog filter: We will define an ideal filter on an analog signal as a filter that removes all frequencies above a given frequency $F_{cut}$, and keeps all lower frequencies as equals.

Given an analog signal $x_a(t)$, we can compute its Fourier transform $X_a(F)$ as:

$$X_a(F) = \int_{-\infty}^{\infty} x_a(t) e^{-j2\pi F t} dt \quad (8)$$

Multiplying $X_a(F)$ by a gate function $$G(F) = \begin{cases} 1, & |F| \leq F_{cut} \\ 0, & |F| > F_{cut} \end{cases} \quad (9)$$

so that $$\check{X}_a(F) = X_a(F) G(F) \quad (10)$$

we can then take the inverse Fourier transform of $\check{X}_a(F)$ to construct a $\check{x}_a(t)$:

$$\check{x}_a(t) = \int_{-\infty}^{\infty} \check{X}_a(F) e^{j2\pi F t} dF \quad (11)$$

By construction, $\check{x}_a(t)$ is the result of applying such ideal filter on $x_a(t)$.

By using the convolution property of the Fourier transform, $\check{x}_a(t)$ can be computed in time space as $$\check{x}_a(t) = (x_a * g)(t) \quad (12)$$

where g is the inverse Fourier transform of G:

$$g(t) = \int_{-\infty}^{\infty} G(F) e^{j2\pi F t} dF \quad (13)$$

$$= \int_{-F_{out}}^{F_{out}} e^{j2\pi F t} dF$$

$$= \text{sinc}(2\pi F_{cut} t).$$

Recall that the ideal low pass filter is the convolution with the function sinc $(2\pi F_{cut} t)$.

Figure 4:
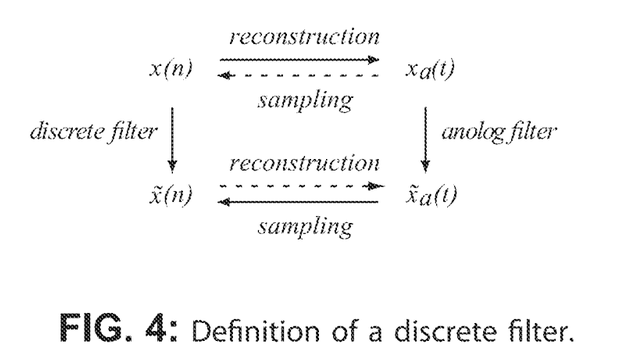
FIG. 4 shows an example non-limiting definition of a discrete filter.

Discrete filter: From an analog filter, we can define a discrete filter on a signal $x(n)$. See FIG. 4. This filter should produce the same output as applying the analog filter on signal $x_a(t)$, produced by ideal interpolation (6) of $x(n)$, and then sampling it.

Let us consider any filter that can be applied on an analog signal as a convolution with a function h(t), called the kernel of the filter:

$$\tilde{x}_a(t) = (x_a * h)(t) \quad (14)$$

We can then express:

$$\tilde{x}(n) = \tilde{x}_a(nT_s) \quad (15)$$

$$= (x_a * h)(nT_s)$$

$$= \int_{-\infty}^{\infty} x_a(\tau) h(nT_s - \tau) d\tau$$

Using the reconstruction formula (6) for $x_a$, $$\tilde{x}(n) = \int_{-\infty}^{\infty} \left( \sum_{i=-\infty}^{\infty} x(i) \text{sinc}(\pi(F_s \tau - i)) \right) h(nT_s - \tau) d\tau \quad (16)$$

$$= \sum_{i=-\infty}^{\infty} x(i) \int_{-\infty}^{\infty} \text{sinc}(\pi(F_s \tau - i)) h(nT_s - \tau) d\tau,$$

and, with a simple change in variable, $$\tilde{x}(n) = \sum_{i=-\infty}^{\infty} x(i) \int_{-\infty}^{\infty} \text{sinc}(\pi(F_s \tau)) h((n-i)T_s - \tau) d\tau \quad (17)$$

The integral can be identified as a convolution of sinc $(\pi(F_s t))$ with h(t). We have seen that such convolution is a low pass filter, with $F_{cut} = \frac{1}{2} F_s$.

Let $\tilde{h}(t)$ be the low-pass filtered version of h(t):

$$\tilde{h}(t) = \int_{-\infty}^{\infty} \text{sinc}(\pi(F_s \tau)) h(t - \tau) d\tau \quad (18)$$

Then the filtering of a digital signal can be defined as the convolution with a sampled version of the kernel h(t), previously filtered to contain no frequency greater than ½F_s.

$$\check{x}(n) = \sum_{i=-\infty}^{\infty} x(i)\check{h}((n-i)T_s) \quad (19)$$

Ideal discrete filter: Let us now consider an ideal analog filter where $$h(t) = \text{sinc}(2\pi F_{cut} t) \quad (20)$$

As the Fourier transform of h(t) is a gate function between $-F_{cut}$ and $F_{cut}$, and assuming that $F_{cut} < \frac{1}{2}F_s$, the low-pass filtering of h(t) (18) has no effect:

$$\check{h}(t) = h(t) \quad (21)$$

An ideal discrete filter is then a convolution with a discrete sinc:

$$\check{x}(n) = \sum_{i=-\infty}^{\infty} x(i)\text{sinc}\left(2\pi \frac{F_{cut}}{F_s}(n-i)\right) \quad (22)$$

This provides a mathematical definition of an ideal discrete filter. As sinc has an infinite support, it cannot be used to derive a computable filter. Nevertheless, it can be approximated very closely by realizable filters.

Ideal downsampler: Using the sampling theorem, an ideal filtered signal, x̌(n), could be resampled at frequency $F_s = 2F_{cut}$ without losing any information.

Figure 5:
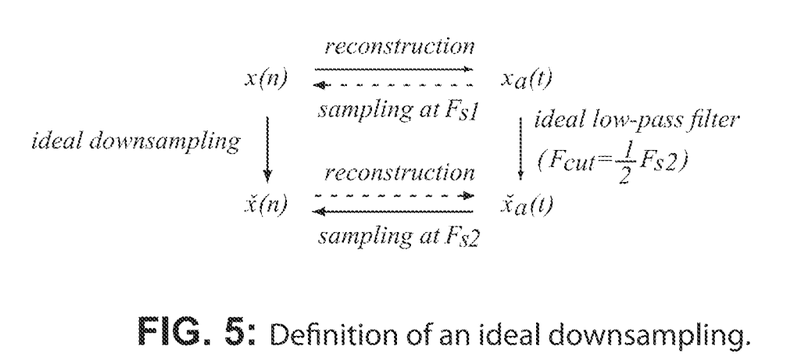
FIG. 5 shows an example non-limiting definition of an ideal downsampling.

We will define an ideal downsampling at frequency $F_{s2}$ of a discrete signal x(n), originally sampled at frequency $F_{s1}$, as producing a signal x̌(n), from which a low-pass filtered version of x(n) with $F_{cut} = \frac{1}{2}F_{s2}$ can be reconstructed. See FIG. 5 definition of an ideal downsampling.

We can define x̌(n) by sampling x̌_a(t):

$$\check{x}(n) = \check{x}_a(nT_{s2}) \quad (23)$$

where x̌(t) is a low-pass filtering of $x_a$(t):

$$\check{x}_a(t) = \int_{-\infty}^{\infty} x_a(\tau)\text{sinc}(\pi F_{s2}(t-\tau))d\tau \quad (24)$$

Using the reconstruction formula for $x_a$(t) as in (16):

$$\check{x}(n) = \int_{-\infty}^{\infty}\left(\sum_{i=-\infty}^{\infty} x(i)\text{sinc}(\pi(F_{s1}\tau - i))\right)\text{sinc}(\pi F_{s2}(nT_{s2} - \tau))d\tau \quad (25)$$

$$= \sum_{i=-\infty}^{\infty} x(i) \int_{-\infty}^{\infty} \text{sinc}(\pi(F_{s1}\tau - i))\text{sinc}(\pi F_{s2}(nT_{s2} - \tau))d\tau$$

$$= \sum_{i=-\infty}^{\infty} x(i) \int_{-\infty}^{\infty} \text{sinc}(\pi(F_{s1}\tau))\text{sinc}(\pi F_{s2}(nT_{s2} - iT_{s1} - \tau))d\tau$$

The integral is the convolution of two sinc. As in the construction of the ideal discrete filter, this simplifies to the lower frequency sinc, in our case, the second one with frequency $F_{s2}$:

$$\check{x}(n) = \sum_{i=-\infty}^{\infty} x(i)\text{sinc}(\pi F_{s2}(nT_{s2} - iT_{s1})) \quad (26)$$

-continued $$= \sum_{i=-\infty}^{\infty} x(i)\text{sinc}\left(\pi\left(n - i\frac{F_{s2}}{F_{s1}}\right)\right)$$

Such an ideal downsampling is useful as it represents an ideal filtered signal with the fewest data needed.

As for the discrete filter, this mathematical definition cannot be used to derive a computable filter but will be approximated.

Two-Dimensional Signals

As we will work on images in the next sections, some results need to be expressed in two dimensions.

Fourier transform: The two-dimensional Fourier transform of a signal g(x,y) is defined as:

$$G(F_x, F_y) = \int_{-\infty}^{\infty}\int_{-\infty}^{\infty} g(x,y)e^{-j2\pi(F_x x + F_y y)} dx\, dy \quad (27)$$

Its inverse transform is:

$$g(x,y) = \int_{-\infty}^{\infty}\int_{-\infty}^{\infty} G(F_x, F_y)e^{j2\pi(F_x x + F_y y)} dF_x\, dF_y \quad (28)$$

Ideal filter: The ideal discrete filter defined in (22) can be transposed to two-dimensions as:

$$\check{x}(i,j) = \sum_{k,l=-\infty}^{\infty} x(k,l)\text{sinc}\left(2\pi\frac{F_{x_{cut}}}{F_{x_s}}(i-k)\right)\text{sinc}\left(2\pi\frac{F_{y_{cut}}}{F_{y_s}}(j-l)\right) \quad (29)$$

Ideal downsampler: The ideal downsampler defined in (26) can be transposed to two-dimensions as:

$$\check{x}(i,j) = \sum_{k,l=-\infty}^{\infty} x(k,l)\text{sinc}\left(\pi\left(i - k\frac{F_{xs2}}{F_{xs1}}\right)\right)\text{sinc}\left(\pi\left(j - l\frac{F_{ys2}}{F_{ys1}}\right)\right) \quad (30)$$

Example Non-Limiting Pixel Art Upscaler model

Figure 7:
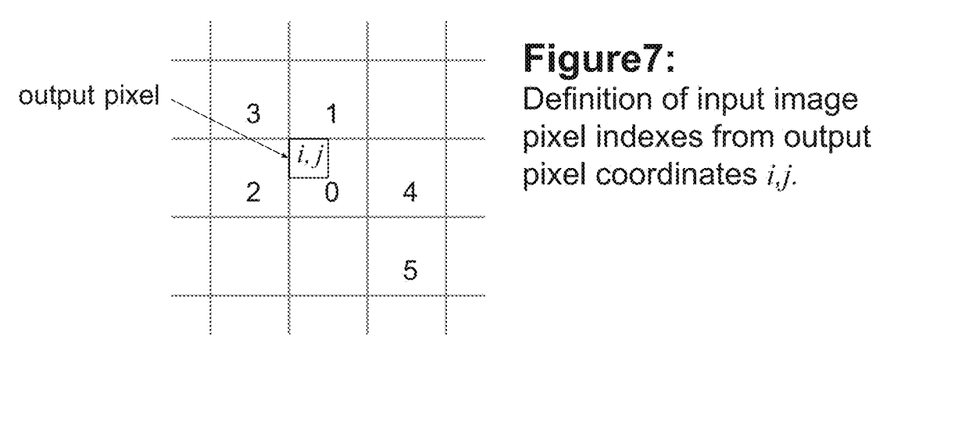
FIG. 7 shows an example non-limiting definition of input image pixel indexes from output pixel coordinates (i,j). Color of the output pixel i, j is computed as a linear combination of input pixels 0 to 3. This linear combination is, in one example non-limiting implementation, chosen from a table using conditions on colors of pixels 0 to 5.

The example non-limiting Pixel Art Upscaler computes each pixel of the output image as a linear combination of the 4 pixels of the input image that are nearest from the output pixel. This linear combination is chosen from a table based on conditions on the 9 nearest pixels of the input image.

$$C_{PAU_{i,j}} = \sum_k \alpha_k C_{0_{i_k j_k}} \quad (31)$$

where $0 \leq k \leq 3$, $i_k$, $j_k$ span the four pixels nearest to pixel i, j. We will use the convention $i_0 j_0 = ij$. $\alpha_k$ are the four coefficients of the linear combination of input colors. This linear combination is, in one example non-limiting implementation, chosen from a table based on conditions on 6 of the 9 nearest pixels of the input image. See FIG. 7, which shows an example non-limiting definition of input image pixel indexes from output pixel coordinates (i,j). Color of the output pixel i, j is computed as a linear combination of input pixels 0 to 3. This linear combination is, in one example non-limiting implementation, chosen from a table using conditions on colors of pixels 0 to 5.

Moreover, this process currently guarantees:

$$\sum_k \alpha_k = 1 \quad (32a)$$

$$\alpha_k \geq 1/2 \text{ if } k = 0 \text{ (ie } i_k j_k = ij) \quad (32b)$$
$$\alpha_k \leq 1/4 \text{ if } k \neq 0 \text{ (ie } i_k j_k \neq ij)$$

The PAU algorithm also ensures symmetry properties. Given any two blocks of 9 pixels such that one is the symmetric of the other along axis x, y or both, or by a rotation of π or −π, the resulting 4 pixels at the center of the block in the output image will present the same symmetry.

Example Non-Limiting Brightness Compensation Algorithm

Figure 7A:
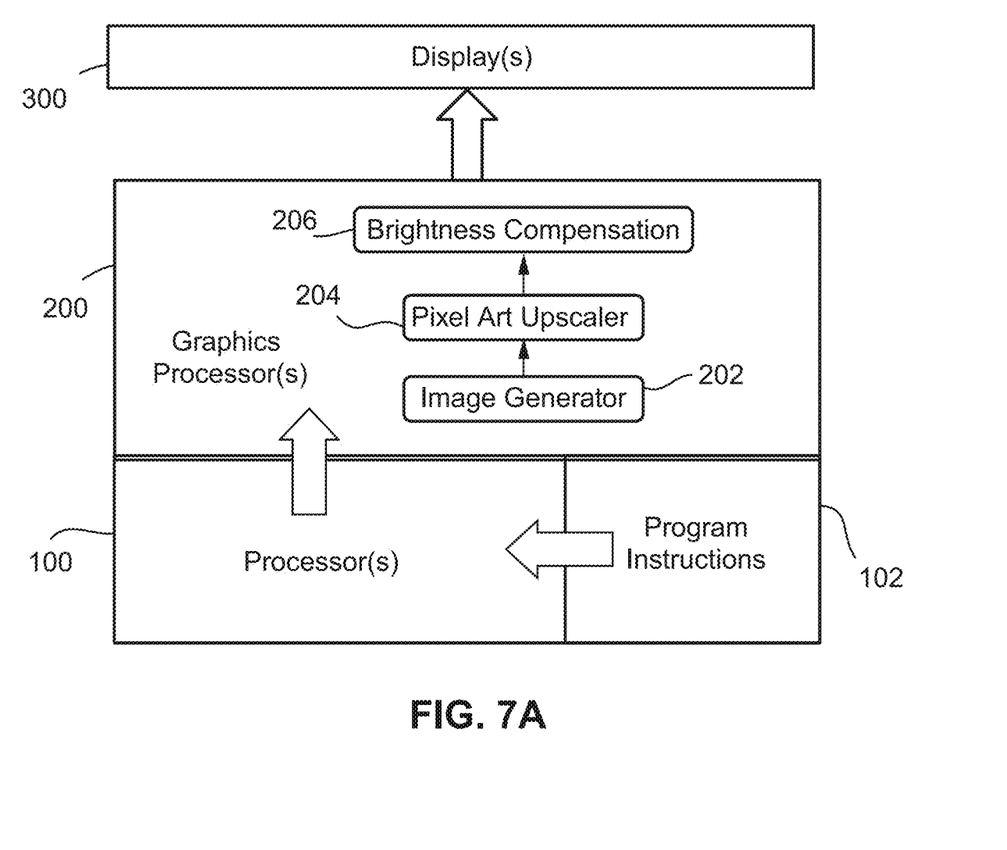
FIG. 7A shows an example non-limiting block diagram of a system including a processor and a graphics processor.

FIG. 7A shows an example non-limiting block diagram of an overall graphics display system including a processor 100 that executes stored program instructions 102; and a graphics processor 200, that generates an image for display on a display 300. In the example shown, the program instructions 102 when executed by processor 100 control the processor to generate commands to graphics processor 200. Those commands control the graphics processor 200 to generate images using conventional graphics processes (e.g., a video game emulator) (block 202), process generated images with a pixel art upscaler PAU described above (block 204), and perform brightness compensation (block 206). These blocks 202, 204 and/or 206 can be performed by the graphics processor 200 and/or the processor 100 with or without additional specialized filtering hardware support. In one example implementation, the PAU and brightness compensation is implemented by instructions stored in a non-transitory storage device that are executed in whole or in part by the graphics processor 200. In other example implementations, the PAU and brightness compensation is implemented by such stored instructions executed in whole or in part by the processor 100. In still other implementations, some or all of the PAU and/or brightness compensation may be performed by specialized hardware. All such implementations are referred to herein as "computer processors".

The example non-limiting implementation adds, after the PAU 204, another process 206 that compensates low frequencies brightness changes due to PAU. This way, the original image and the SPAU filtered image are equal when low pass filtered.

Example Non-Limiting Brightness Compensation Algorithm

Let A be the input image and B be the PAU version of A (i.e., B is the PAU filtered image in this particular example embodiment). B's pixel count in this particular case is 2×2 times that of A.

Figure 8:
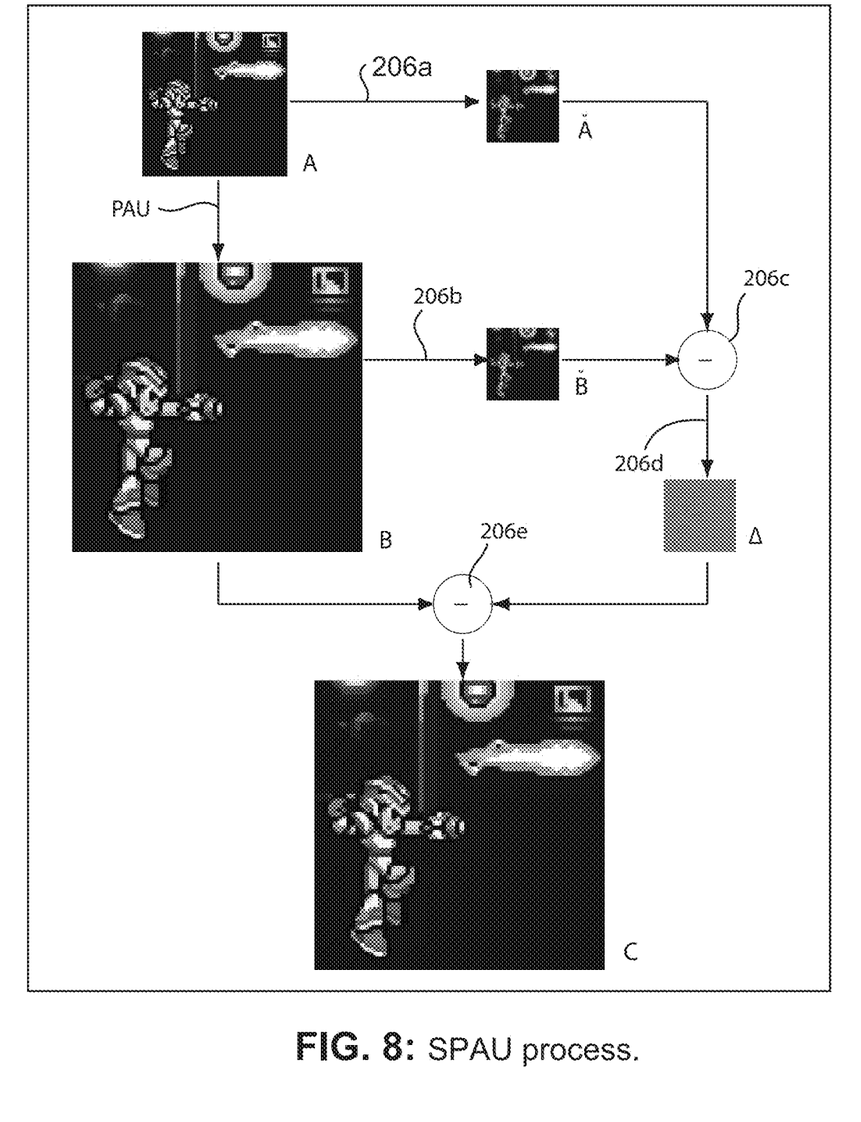
FIG. 8 shows an example non-limiting brightness compensation process.
Figure 9:
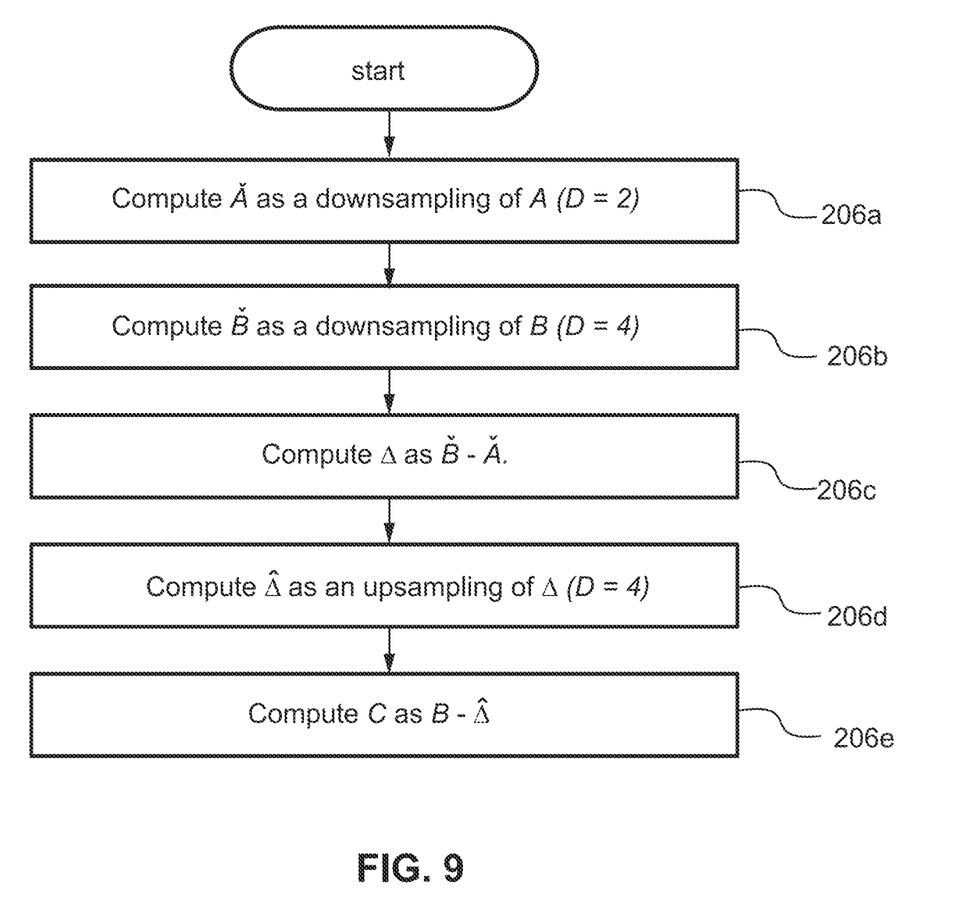
FIG. 9 shows an example non-limiting flowchart.

The example non-limiting brightness compensation 206 algorithm includes the following steps (see FIGS. 8 & 9):

1. Downsampler computes and stores in a memory Ă as a downsampling of original image A (D=2) (block 206a).
2. Downsampler computes and stores in a memory B̆ as a downsampling of PAU-filtered image B (D=4) (block 206b).
3. Comparator computes and stores in a memory Δ as B̆−Ă (block 206c).
4. Upsampler computes and stores in a memory Δ̂ as an upsampling of Δ (D=4) (block 206d).
5. Subtractor computes C as B−Δ̂ (block 206e) for display. Here, note that Δ and Δ̂ are each two-dimensional arrays, and C is computed by subtracting the appropriate value in Δ̂ from B. Also observe that Ă and B̆ are low-frequency versions of A and B, and that Ă and B̆ are the same size in this particular example in order to simplify the differencing operation of block 206c.

By construction, this example non-limiting process guarantees that the frequency spectrum of C is very close to that of A for low frequencies. A validity check can be done by computing Č as an ideal downsampling of C and comparing it to Ă. Such calculation can be performed efficiently in real time on a stream of images generated periodically (e.g., 30 or 60 times per second) in real time in the context of real time image generation, or it could be performed in a batch mode to produce one or a stream of images for storage and later display.

Using the brightness compensation after the PAU, we can then guarantee that there will be no low frequency luminance change.

Example Non-Limiting Downsampler

As seen above, an ideal downsampler of factor D can be mathematically defined as:

$$\check{A}_{ij} = \sum_{k,l} A_{kl} \text{sinc}\left(\pi\left(i - \frac{k}{D}\right)\right)\text{sinc}\left(\pi\left(j - \frac{l}{D}\right)\right) \quad (33)$$

As already seen, such filter is not computable but can be approximated with a finite support filter.

The example non-limiting algorithm uses an approximation of an ideal downsampler of factor D, that is, a process which resamples an image A, producing an image Ă of lower resolution whose spatial frequency spectrum is exactly the same as A for frequencies up to a maximum frequency $F_{max}$, and with no frequency greater than $F_{max}$.

The example non-limiting embodiment will use a Lanczos2 filter, which is known to perform well. See e.g., Ken Turkowski, Filters for common resampling tasks (April 1990). This filter is defined by the kernel:

$$Lanczos2(x) = \begin{cases} \text{sinc}(\pi x)\text{sinc}\left(\pi\frac{x}{2}\right), & |x| < 2 \\ 0, & |x| \geq 2 \end{cases} \quad (34)$$

The resulting image is computed by an ideal downsampler of factor D that can be mathematically defined as:

$$\check{A}_{ij} = \sum_{kl \in K} A_{kl} Lanczos2\left(i - \frac{k}{D}\right) Lanczos2\left(j - \frac{l}{D}\right) \quad (35)$$

Such filter introduces an error that is localized around the cutoff frequency. However, the result for lower frequencies is very close to an ideal subsampling. See FIG. 6 which shows a kernel of the Lanczos2 filter for D=2 (left) and its Fourier transform (right).

Figure 6:
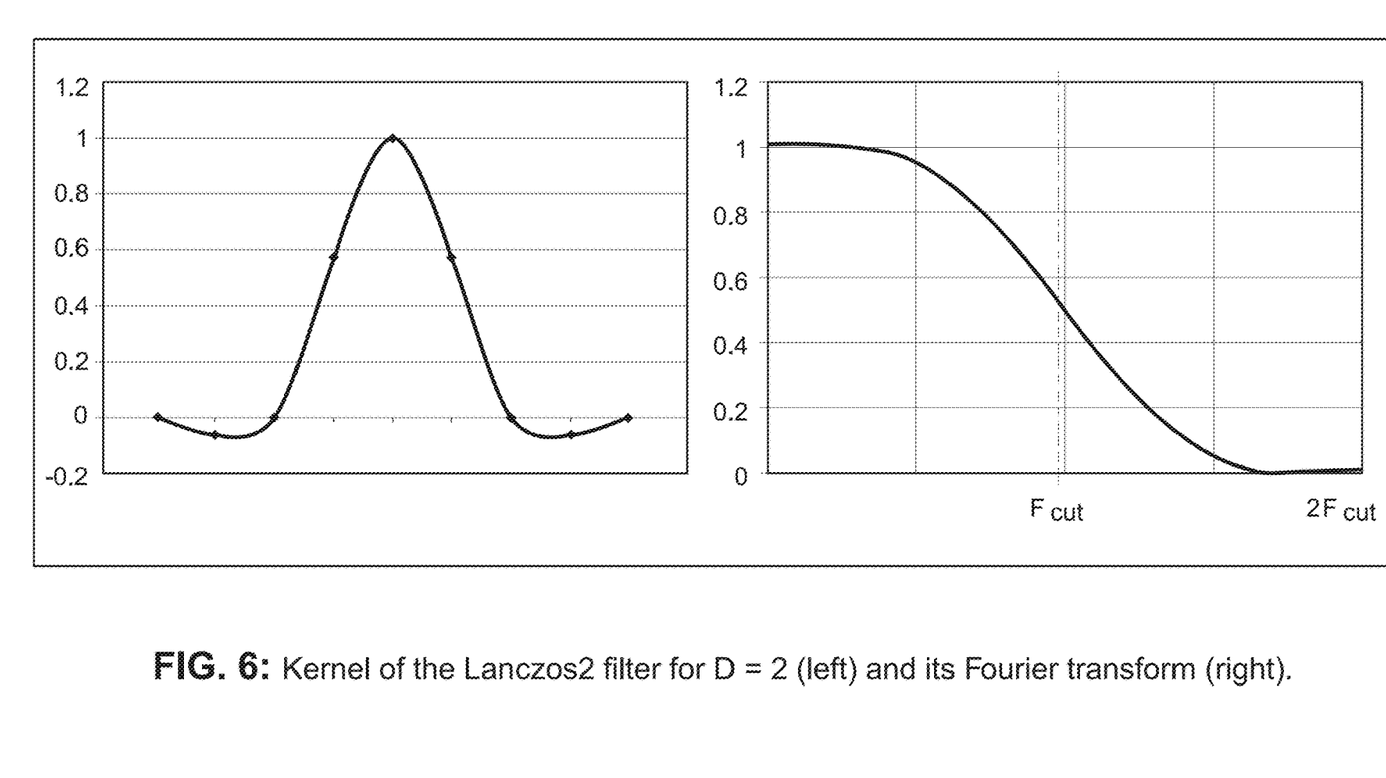
FIG. 6 shows an example non-limiting kernel of the Lanczos2 filter for D=2 (left) and its Fourier transform (right).

As can be seen in FIG. 6, the Fourier transform is very flat in the low frequencies domain, 0.5 $F_{cut}$ where this frequency can be attenuated to ~95% of its original value. It is also very near to 0 for high frequencies, greater than 1.5 $F_{cut}$. We can also note that no frequency is amplified, which is a good feature for an eye-pleasing filter (the contrary would generate little wavelets around hard edges in the picture).

Working on 8-bits image, we can assume that there is no difference with an ideal filter for frequencies up to ~0.5 $F_{cut}$, and that any high frequency greater than ~1.5 $F_{cut}$ will be effectively removed (their amplitude being about the quantification step). See Ken Turkowski, *Filters for common resampling tasks*, April 1990.

Example Non-Limiting Upsampler

The example non-limiting embodiment also uses an approximation of an ideal upsampler of factor D which produces a higher resolution image, Â, from an image, A.

This upsampler is, in one non-limiting embodiment, defined using the Lanczos2 kernel:

$$\hat{A}_{ij} = \sum_{kl} A_{kl} Lanczos2((k+iD))Lanczos2((l+jD)) \quad (36)$$

Other filters could be used instead of Lanczos2. It is desired that such upsample filters do not themselves create any artifacts or exhibit unpredictable behavior.

Flash Compliance

A potentially harmful flash is defined by most of the international guidelines as a pair of opposing transitions in luminance of more than 20 cd·m², covering more than one-fourth of the screen. See e.g., International Telecommunication Union, *Guidance for the reduction of photosensitive epileptic seizures caused by television*, 2005; Ofcom, *Ofcom Guidance Note on Flashing Images and Regular Patterns in Television* (2012). These and other standards define potentially harmful flashes as involving saturated red and saturated red transitions. For example, a working definition for a "pair of opposing transitions involving a saturated red" can be found in W3C, *Web Content Accessibility Guidelines (WCAG)* 2.0, 2008. It involves a linear combination of the three color channels, and can be measured similarly as luminance flashes.

The international guidelines do not specify exactly how luminance measurements must be done. However, ITU suggests that a unified specification for measurements should be studied, and suggest that such specification should include a spatial filtering of frames (see ITU, *Guidance for the reduction of photosensitive epileptic seizures caused by television*, 2005, appendix 3]).

The example non-limiting disclosed algorithm guarantees an output image equal to the raw image when considering only the low spatial frequencies (with period T≥8 px in output image). For example, assuming a raw image size of 256 pixels×224 pixels viewed with about 30° angle, this means that no brightness difference can be seen of 0.5° angle or more. The disclosed non-limiting SPAU algorithm discussed above is then conservative considering flashes.

Pattern Compliance

Some sources define a potentially harmful regular pattern as containing clearly discernible stripes when there are more than five light-dark pairs of stripes. Although pattern recognition algorithms can work with this definition, it does not give a practical mathematical definition. However, a regular pattern has a specific frequency footprint, with a high amplitude at the main frequency of the pattern.

The example non-limiting SPAU algorithm, by producing images that have a frequency spectrum as close as possible as the original images, guarantees that, if no regular pattern is present in the original image, no regular pattern with low frequency (T≥8 px) will be present in the output image.

However, high frequencies will be introduced by the example non-limiting PAU, and are intentional as they are needed to produce the intended hard edges of pixel art images. Nevertheless, such frequencies are expected to remain in very local areas of the image (edges).

Recall from equations (31) and (32) that an example non-limiting pixel value is bounded by the extrema of the four surrounding pixels. Moreover, its original value contributes to at least half of its new value. This guarantees that no high frequency could appear in flat color areas of an input image. Any high amplitude, high frequency pattern in output image would then require higher color variations at the pixel level in the input image. It may be possible that irregular patterns can generate higher frequency regular pattern. However, using the example non-limiting SPAU, no harmful flashes can be introduced in a flash-free material. There remains a low risk of induced low amplitude regular patterns.

Meanwhile, the brightness compensation techniques disclosed herein will restore low frequency components that were removed as a side effect of high frequency filtering. Thus, the technology herein is particularly advantageous for filters that target high frequencies, and can be used to ensure that such filters do not affect the low frequencies too. Such filters can include the disclosed PAU filtering, mosaic filtering, noise reduction filtering. The non-limiting example technology is particularly useful when the prefiltered image (or brightness parameters of same) are available for comparison with the postfiltered image irrespective of the type of filtering and the image source.

While the invention has been described in connection with what is presently considered to be the most practical and preferred embodiment, it is to be understood that the invention is not to be limited to the disclosed embodiment. For example, the brightness compensation techniques described herein can work with any filter or other technique, not just with the PAU techniques described herein. In particular, the brightness compensation techniques can be applied to any images irrespective of source. Thus, the invention is intended to cover various modifications and equivalent arrangements included within the spirit and scope of the appended claims.

What is claimed is:

1. A method of brightness-compensating a higher resolution image produced from a lower resolution image, comprising performing, with at least one processor or processing circuit, operations comprising:
   processing the lower resolution image to produce first two-dimensional (2D) low spatial frequency data;
   processing the higher resolution image to produce second 2D low spatial frequency data;
   comparing the first and second 2D low spatial frequency data to develop 2D difference information;
   upsampling the 2D difference information; and
   brightness compensating the higher resolution image for brightness changes introduced by producing the higher resolution image from the lower resolution image, by modifying the higher resolution image in accordance with the upsampled 2D difference information to produce a modified higher resolution image.

2. The method of claim 1 wherein the lower resolution image comprises pixel art.

3. The method of claim 1 wherein processing the lower resolution image to produce first 2D low spatial frequency data comprises low frequency filtering.

4. The method of claim 1 wherein the modifying comprises filter band limiting that preserves low spatial frequencies while making the modified higher resolution image photosensitive-safe.

5. The method of claim 1 wherein the modifying prevents artifacts introduced by producing the higher resolution image from the lower resolution image from incurring global brightness modifications.

6. The method of claim 1 wherein the modifying compensates brightness changes to ensure the lower resolution image and the modified higher resolution image have the same brightness when measured over medium to large display areas.

7. The method of claim 1 wherein a lowpass filter of the lower resolution image and a lowpass filter of the modified higher resolution image are identical.

8. The method of claim 1 wherein the comparing smooths out high frequency signals, thereby revealing low frequency patterns.

9. The method of claim 1 wherein the modified higher resolution image is more faithful to the lower resolution image than the higher resolution image before modification.

10. The method of claim 1 wherein processing the higher resolution image to produce second 2D low spatial frequency data comprises applying a sinc function.

11. A system for generating images comprising at least one processor or processing circuit configured to perform brightness compensation on a higher resolution image produced from a lower resolution image, the at least one processor or processing circuit being configured to perform operations comprising:
processing the lower resolution image to produce first two-dimensional (2D) low spatial frequency data;
processing the higher resolution image to produce second 2D low spatial frequency data;
comparing the first and second 2D low spatial frequency data to develop 2D difference information;
upsampling the 2D difference information; and
modifying the higher resolution image in accordance with the upsampled 2D difference information to produce a modified higher resolution image.

12. The system of claim 11 wherein the lower resolution image comprises pixel art.

13. The system of claim 11 wherein processing the lower resolution image to produce first 2D low spatial frequency data comprises low frequency filtering.

14. The system of claim 11 wherein the modifying is configured to band limit filter the higher resolution image to preserve low spatial frequencies while making the higher resolution image photosensitive-safe.

15. The system of claim 11 wherein the modifying is configured to prevent artifacts introduced by producing the higher resolution image from the lower resolution image from incurring global brightness modifications.

16. The system of claim 11 wherein the modifying is configured to compensate brightness changes to ensure the lower resolution image and a modified higher resolution image have the same brightness when measured over medium to large display areas.

17. The system of claim 16 wherein a low pass filtered version of the lower resolution image and a lowpass filtered version of the modified higher resolution image are identical.

18. The system of claim 11 wherein the comparing is structured to reveal underlying low frequency patterns by smoothing out high frequency signals, thereby increasing the contrast of the low frequency patterns by using the energy of the high frequency signals.

19. The system of claim 11 wherein the modified higher resolution image is more faithful to the lower resolution image than the higher resolution image before modification.

20. The system of claim 11 wherein processing the higher resolution image to produce second 2D low spatial frequency data comprises applying a SINC function.

21. The system of claim 11 wherein the compensating is configured to compensate for flashes introduced by producing the higher resolution image from the lower resolution image.

22. An apparatus comprising:
at least one processor or processing circuit that processes a lower resolution version of an image to produce first two-dimensional (2D) low spatial frequency data and processes a higher resolution version of the image to produce second 2D low spatial frequency data,
the at least one processor or processing circuit providing a comparator connected to compare the first and second 2D low spatial frequency data to develop two-dimensional difference information;
the at least one processor or processing circuit providing an upsampler connected to the comparator, the upsampler upsampling the 2D difference information; and
the at least one processor or processing circuit providing an image processor operatively coupled to the comparator and configured to apply the upsampled 2D difference information to the higher resolution version of the image to compensate the higher resolution version of the image for brightness flashes.

23. A method comprising:
processing a lower resolution version of an image and a higher resolution version of the image to produce first and second two-dimensional low spatial frequency data, respectively,
comparing the first and second two-dimensional low spatial frequency data to develop two-dimensional difference information,
upsampling the two-dimensional difference information, and
applying the upsampled two-dimensional difference information to the higher resolution version of the image to compensate the higher resolution version of the image for brightness flashes.

* * * * *